United States Patent
Sfez et al.

(10) Patent No.: US 11,204,325 B2
(45) Date of Patent: Dec. 21, 2021

(54) REAL-TIME CHEMICAL SENSING USING STIMULATED RAMAN SCATTERING IN NANOFIBERS

(71) Applicant: Soreq Nuclear Research Center, Yavne (IL)

(72) Inventors: Bruno Sfez, Jerusalem (IL); Shaul Pearl, Nehusha (IL); Sharone Goldring, Yavne (IL); Yoav Sintov, Petach Tikva (IL)

(73) Assignee: Soreq Nuclear Research Center, Nahal Sored (IL)

( * ) Notice: Subject to any disclaimer, the term of this patent is extended or adjusted under 35 U.S.C. 154(b) by 0 days.

(21) Appl. No.: 17/055,590

(22) PCT Filed: May 26, 2019

(86) PCT No.: PCT/IB2019/054359
§ 371 (c)(1),
(2) Date: Nov. 15, 2020

(87) PCT Pub. No.: WO2019/229620
PCT Pub. Date: Dec. 5, 2019

(65) Prior Publication Data
US 2021/0223180 A1    Jul. 22, 2021

Related U.S. Application Data

(60) Provisional application No. 62/677,009, filed on May 27, 2018.

(51) Int. Cl.
*G01J 3/44* (2006.01)
*G01N 21/65* (2006.01)
*G01N 21/78* (2006.01)

(52) U.S. Cl.
CPC .......... *G01N 21/65* (2013.01); *G01N 21/783* (2013.01); *G01N 2021/655* (2013.01)

(58) Field of Classification Search
CPC ...... A61B 5/0075; G01N 21/65; G01N 21/64; G01N 21/783; G01N 2021/655; G01J 3/0218; G01J 3/44
See application file for complete search history.

(56) References Cited

U.S. PATENT DOCUMENTS

2012/0236314 A1* 9/2012 Fermann .................. H01S 3/10
356/479
2016/0047750 A1 2/2016 Pascal

FOREIGN PATENT DOCUMENTS

WO    2017/148858    9/2017

OTHER PUBLICATIONS

PCT Search Report and Written Opinion PCT/IB2019/054359, dated Sep. 20, 2019.
(Continued)

*Primary Examiner* — Abdullahi Nur
(74) *Attorney, Agent, or Firm* — Dekei Patent Ltd.; David Klein

(57) ABSTRACT

A system includes a laser (1) operative to emit a light beam, a beam splitter (2) arranged to split the light beam into a first beam and a second beam, the first beam being directed to a nonlinear converter (8) that generates a signal beam having a Stokes-shifted wavelength, a recombiner (9) arranged to recombine the signal beam with the second beam to form a recombined beam which is directed to a tapered optical fiber (5) located within a material to be monitored, and a detector (7) arranged to detect light emitted by the tapered optical fiber (5) and which uses stimulated Raman spectroscopy to detect a chemical in the material.

10 Claims, 2 Drawing Sheets

(56) References Cited

OTHER PUBLICATIONS

Shan Liye et al., "Stimulated Raman scattering in the evanescent field of liquid immersed tapered nanofibers", Applied Physics Letters, vol. 102, No. 20, May 20, 2013.
Yun Qui et al., "Nanofiber enhanced stimulated Raman spectroscopy for ultra-fast, ultra-sensitive hydrogen detection with ultra-wide dynamic range", Optica vol. 6, Issue 5, pp. 570-576, Apr. 30, 2019.

\* cited by examiner

REAL-TIME CHEMICAL SENSING USING STIMULATED RAMAN SCATTERING IN NANOFIBERS

FIELD OF THE INVENTION

The present invention relates generally to real-time sensing of chemical compounds, and particularly to a system for real-time chemical sensing using stimulated Raman scattering in nanofibers.

BACKGROUND OF THE INVENTION

Real-time sensing of chemicals or biological compounds is critical in a wide range of industries: environment monitoring (water, atmosphere), food processing monitoring (drinks, dairy products), oil and gas.

A large number of methods, either using chemical agents or physical interaction (such as fluorescence) have been proposed and field deployed. However a major drawback of these methods is their lack of specificity. This is all the more critical when the molecule that is monitored does not have a rich spectrum.

One of the preferred methods for specific identification is Raman spectroscopy. However this method generates extremely weak signals that require relatively expensive equipment, and is hardly portable.

An alternative to spontaneous Raman spectroscopy is stimulated Raman spectroscopy (SRS). This method is based on the nonlinear optical interaction of two laser beams in the medium of interest. The two laser beams frequencies must be separated by the Stokes frequency of the tested molecule. The high frequency beam power is usually relatively strong relative to the low frequency beam, and is called the pump, while the other is called the signal. Using virtual levels in the molecule, energy is transferred from the pump to the signal.

If one of the beams is modulated, then the modulation is reflected on both beams and standard demodulation techniques (such as lock-in amplification) can be used for detecting the energy transfer from one beam to the other.

This method is well known and has been already widely employed. However, the standard configuration for SRS is not convenient for real time monitoring for several reasons:

a. The beam is generally focused in order to get the highest possible peak power at the nonlinear interaction location. This means the interaction length is limited to the Rayleigh range b. The sample is brought to the optical system, which requires manual handling.

c. SRS systems require high power and tunable lasers in order to generate the proper SRS signal, which leads to expensive systems, far too expensive for widespread sensors.

An alternative SRS configuration has been developed in the field of fiber amplifiers. There, the Raman material is the fiber core itself. Single mode light within the fiber generates the nonlinear interaction and very high conversion (near to 100%) is obtained.

It may be possible to obtain extremely high conversion efficiencies using hollow core fibers filled with nonlinear material such as hydrogen gas or methanol liquid.

The problem with this approach is that filling the hollow fiber takes a lot of time (several weeks for gas filling for example) and this is not practical for real time monitoring.

SUMMARY OF THE INVENTION

The present invention seeks to provide a system for real-time chemical sensing using stimulated Raman scattering in nanofibers, as is described more in detail hereinbelow.

There is provided in accordance with a non-limiting embodiment of the invention a system including a laser operative to emit a light beam, a beam splitter arranged to split the light beam into a first beam and a second beam (also referred to as the pump beam), the first beam being directed to a nonlinear converter that generates a signal beam having a frequency equal to the pump beam's frequency less the Stokes frequency, a recombiner arranged to recombine the signal beam with the second beam to form a recombined beam which is directed to a tapered optical fiber located within a material to be monitored, and a detector arranged to detect light emitted by the tapered optical fiber and which uses stimulated Raman spectroscopy to detect a chemical in the material.

In accordance with a non-limiting embodiment of the invention an optical modulator is arranged to modulate the signal beam with a modulation before recombining with the second beam, the modulation being transferred to the second beam.

In accordance with a non-limiting embodiment of the invention a filter filters out the signal beam prior to the detector.

In accordance with a non-limiting embodiment of the invention a demodulation system is arranged to detect amplitude of energy transfer of a signal generated by the detector.

In accordance with a non-limiting embodiment of the invention the nonlinear converter is based on stimulated Raman scattering wherein a nonlinear medium of the nonlinear converter is identical to the chemical to be monitored in the material, the nonlinear medium being of sufficient concentration to generate stimulated Raman emission.

In accordance with a non-limiting embodiment of the invention a phase modulator is arranged to generate a frequency shift in the signal beam.

In accordance with a non-limiting embodiment of the invention heat transfer apparatus is arranged to heat or cool the nonlinear converter that generates the signal beam.

In accordance with a non-limiting embodiment of the invention another medium is provided different than the chemical to be monitored, which causes a Stokes shift in the signal beam which is identical to the Stokes shift of the chemical to be monitored.

In accordance with a non-limiting embodiment of the invention the tapered optical fiber includes a grating for blocking any undesirable wavelength.

BRIEF DESCRIPTION OF THE DRAWINGS

The present invention will be understood and appreciated more fully from the following detailed description taken in conjunction with the drawings in which.

DETAILED DESCRIPTION

Figure 1:
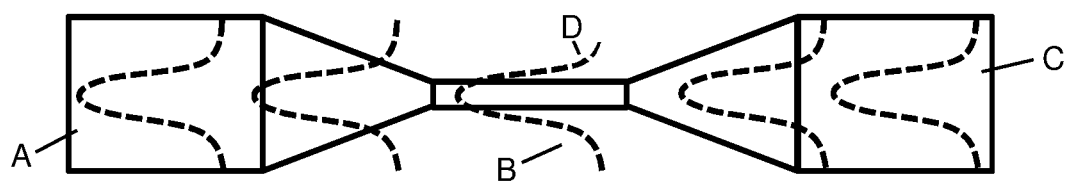
FIG. 1 is a simplified illustration of a tapered fiber used in an embodiment of the invention, wherein light is evanescent in the tapered region and is in direct contact with the environment.

Reference is now made to FIG. 1, which illustrates a tapered fiber used in an embodiment of the invention.

In regions a and c laser light is confined in the single mode fiber. The fiber's diameter is then adiabatically reduced so that it reaches subwavelength dimension in the region b. Then the wave d is partially confined within the fiber and partially outside the fiber, propagating within the surrounding medium and interacting with it.

Thus, light is coupled to a standard single mode fiber that is then tapered down to a few hundreds of nanometers. In the thin tapered region, light is partly outside the fiber itself, and propagates in fact within the medium surrounding the fiber. It therefore can interact with this medium though linear or nonlinear interaction.

A critical aspect of the prior art is the requirement of two lasers: one for the pump and one for the signal. The present invention provides a solution for eliminating this constraint, as is now described with reference to FIG. 2.

In one embodiment, it is assumed that one is interested in monitoring a given compound that might be found only in traces within the surrounding medium of the fiber. The Raman shift of this compound is well-known, so that two laser wavelengths (pump wavelength and signal wavelength) can be perfectly defined in order to generate the SRS signal.

Light exits from a laser 1 and impinges on a beam splitter 2. One of the beams (the "signal" beam) is directed towards a cell filled with the compound to be detected, through a tapered fiber 3. The signal beam then goes through an optical modulator 4 and is recombined with the initial beam in a recombiner 9, in which the combined beam goes through a cell which contains a tapered fiber 5 in the environment to be tested. One of the beams is filtered out and light is detected by a detector 7. The electrical signal is sent to a demodulation system 6 that detects the amplitude of the energy transfer.

Figure 2:
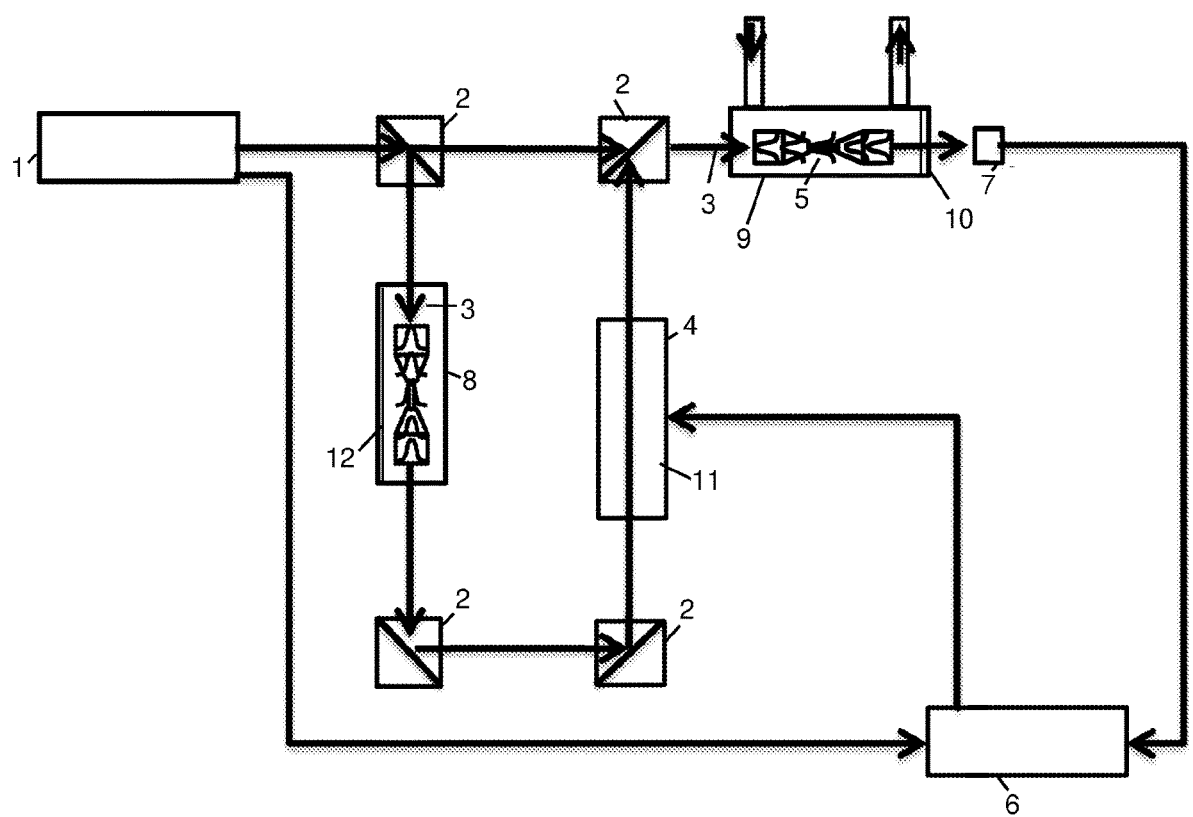
FIG. 2 is a simplified illustration of a system for real-time chemical sensing using stimulated Raman scattering in nanofibers, in accordance with an embodiment of the invention.

In summary, as opposed to the prior art, only one laser is used and the second wavelength beam is derived through nonlinear interaction of this laser. In order to do so, light from the laser 1 is split into two beams. The strong beam is sent to a wavelength convertor 8 that generates the signal beam whose frequency equals the laser frequency less the Stokes shift. The other beam is defined as the pump beam (whose frequency is the laser frequency). The signal beam is then recombined with the pump beam and both are coupled within the tapered fiber (of FIG. 1) that is located within the medium to be monitored (as seen in FIG. 2).

A spectral filter 10 can be used to remove the signal beam (it can be integrated within the fiber or external to it) and only the pump is detected on the detector 7.

A modulator 4 may be positioned before both beams are recombined in order to modulate the signal beam. This modulation is then transferred to the pump beam and the modulation amplitude is detected using a lock-in demodulation scheme.

In a preferred embodiment, the nonlinear converter 8 is based on stimulated Raman scattering where the nonlinear medium is the same compound as the one that is to be monitored. The difference is that in this cell, the nonlinear medium is at a high concentration level so that stimulated Raman emission can be generated from spontaneous Raman emission.

Since the concentration levels might be very different in the two cells, the Raman shifts might be slightly different, and no energy transfer would be observed. In order to compensate for this possible difference several compensation schemes are possible:

1) A phase modulator 11 can be introduced before or after the amplitude modulator, or even better, integrated within the amplitude modulator, in order to generate a compensating frequency shift.

2) The cell in nonlinear converter 8 can be heated or cooled by heat transfer apparatus 12 so that the temperature dependence compensates for the concentration dependence.

3) A different compound that has exactly the required Stokes shift as the one in the monitored cell is put inside the nonlinear conversion cell.

The compound might be diluted within another medium which will act as the Raman medium and generate the stimulated conversion if its Raman cross-section is stronger than the compound itself. In order to reduce this adverse effect, a grating can be inscribed in the fiber so that the undesirable wavelength is blocked or ejected from the fiber, so as to block the building up of the stimulated emission. Such a grating can be a long period grating or a slanted grating.

The SRS process is cumulative, meaning that the longer the interaction length the higher the conversion rate. Tapered fibers are limited in length because of their fragility (about a few centimeters maximum length). The SRS effect can be reinforced by splicing together several tapered fibers so that the cumulated length can be much longer than a few centimeters, and the stimulated Raman conversion will be much stronger.

The invention claimed is:

1. A system comprising:
   a laser (1) operative to emit a light beam;
   a beam splitter (2) arranged to split said light beam into a first beam and a second beam, said first beam being directed to a nonlinear converter (8) that generates a signal beam having a wavelength shifted by a Stokes shift;
   a recombiner (9) arranged to recombine said signal beam with said second beam to form a recombined beam which is directed to a tapered optical fiber (5) located within a material to be monitored; and
   a detector (7) arranged to detect light emitted by said tapered optical fiber (5) and which uses stimulated Raman scattering spectroscopy to detect a chemical in said material.

2. The system according to claim 1, wherein a frequency of said signal beam equals a frequency of said laser (1) minus the Stokes shift, and said second beam has a frequency equal to said laser frequency.

3. The system according to claim 1, further comprising an optical modulator (4) arranged to modulate said signal beam with a modulation before recombining with said second beam, said modulation being transferred to said second beam.

4. The system according to claim 1, further comprising a filter (10) that filters out said signal beam prior to said detector (7).

5. The system according to claim 1, further comprising a demodulation system (6) arranged to detect amplitude of energy transfer of a signal generated by said detector (7).

6. The system according to claim 1, wherein said nonlinear converter (8) is based on stimulated Raman scattering wherein a nonlinear medium of said nonlinear converter (8) is identical to said chemical in said material, said nonlinear medium being of sufficient concentration to generate stimulated Raman emission.

7. The system according to claim 2, further comprising a phase modulator (11) arranged to adjust the said Stokes shift.

8. The system according to claim 2, further comprising heat transfer apparatus (12) arranged to heat or cool said nonlinear converter (8) and adjust said Stokes shift.

9. The system according to claim 6, further comprising another medium different than said nonlinear medium that causes the same Stokes shift as said chemical in said signal beam.

10. The system according to claim 1, wherein said tapered optical fiber (5) comprises a grating for blocking any undesirable wavelength.

* * * * *